Patented Mar. 4, 1930

1,749,607

UNITED STATES PATENT OFFICE

REED P. ROSE, OF JACKSON HEIGHTS, AND HAROLD E. CUDE, OF FLORAL PARK, NEW YORK, ASSIGNORS TO THE NAUGATUCK CHEMICAL COMPANY, OF NAUGATUCK, CONNECTICUT, A CORPORATION OF CONNECTICUT

METHOD OF DISPERSING RECLAIMED RUBBERS

No Drawing.    Application filed August 20, 1927. Serial No. 214,451.

Artificial lattices or aqueous dispersions of rubber have been made heretofore by two general methods, one of which involves the mechanical disintegration of rubber in the presence of a hydrophylic colloid, while the second method brings in the operation of forming a solution of raw rubber prior to dispersing in water containing a hydrophylic colloid.

The present invention relates to the preparation of aqueous dispersions of rubber and particularly of reclaimed rubber by an improved method which comprises softening the reclaimed rubber in an aliphatic oil and preferably a mineral oil, and dispersing the softened mass in water in the presence of a suitable protective agent.

As one illustration, 500 parts by weight of reclaimed rubber are allowed to absorb 250 parts by weight of medium spindle oil. This may be accomplished by allowing the rubber to stand in the oil over night. The mass is then placed in a closed mixer and worked mechanically for a time until it has become well plasticized. A solution of 125 parts of rosin soap in 225 parts of water is introduced into the mixer and the mechanical treatment continued until the whole mass is uniform in texture. Preferably the mass is maintained in a slightly alkaline condition, and to insure this, a small amount of free alkali may be added, if necessary, during the manufacturing operation. The product obtained is a smooth aqueous paste in which the reclaimed rubber is thoroughly dispersed. The paste may be diluted with water to any desired consistency. It is stable, but may be coagulated by the addition of anything which will break the emulsion. The paste, or artificial latex, may be used directly as such for manufacturing purposes in substantially the same way as the natural latex is used. The artificial product may be used as a compounding ingredient for natural latex, whereupon special properties are imparted to the composition. Ordinarily the product of this invention is somewhat sticky in nature, due to the amount of oil which has been employed.

As another method of making the product, the oil and rubber are placed directly into a mixer and subjected to mechanical treatment therein until the mass is thoroughly plasticized. The water and rosin soap are then added as above described. The amount of spindle oil may be reduced to 125 parts on 500 of the rubber or smaller percentages may be employed. In this instance the time required for effecting the dispersion will be longer. The amount of rosin soap may be varied considerably. One suitable proportion, in addition to that above given, comprises 75 parts of the soap to 300 of water. Other protective agents, such as water-soluble soaps, may be substituted for the rosin soap, for example, sodium or potassium oleates, stearates, palmitates, undecylenates, etc.

Instead of the spindle oil, other water insoluble mineral oils or vegetable oils or oleaginous products, such as cotton seed oil, palm oil, may be employed. Preferably the oil or oily material is one of the high molecular weight aliphatic type, although the invention may be successfully practiced with aromatic hydrocarbons. It is not necessary for any solution to take place, and it is believed that with materials mentioned no appreciable amount of solution can take place during the course of the process. For example, if reclaimed rubber be placed in a mixer with one-half its weight of castor oil, or cotton seed oil, practically no solution can take place during the ordinary course of plasticizing.

The product of this invention is particularly well adapted to the manufacture of paper by processes in which the aqueous dispersion of rubber is incorporated with the paper making fibre while the latter is still in the beater. The dispersion is susceptible of coagulation, and may be treated in substantially the same manner as it has been proposed to treat natural rubber latex in the manufacture of papers of this type.

Having thus described our invention, what we claim and desire to protect by Letters Patent is:

A method of manufacturing aqueous dispersions of reclaimed rubber which comprises softening reclaimed rubber with spindle oil, plasticizing the softened rubber, subjecting said plasticized softened rubber to mechanical action in water containing a water soluble rosin soap until a smooth dispersion is obtained.

Signed at New York, county and State of New York, this 15 day of August, 1927.
REED P. ROSE.

Signed at New York, county and State of New York, this 15 day of August, 1927.
HAROLD E. CUDE.